US010187139B2

(12) United States Patent
Dangy-Caye

(10) Patent No.: US 10,187,139 B2
(45) Date of Patent: Jan. 22, 2019

(54) RELAY RESIDENTIAL GATEWAY BETWEEN A TERMINAL DEVICE AND A SERVER

(71) Applicant: SAGEMCOM BROADBAND SAS, Rueil Malmaison (FR)

(72) Inventor: Nicolas Dangy-Caye, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 67 days.

(21) Appl. No.: 15/325,541

(22) PCT Filed: Jul. 7, 2015

(86) PCT No.: PCT/EP2015/065446
§ 371 (c)(1),
(2) Date: Jan. 11, 2017

(87) PCT Pub. No.: WO2016/005371
PCT Pub. Date: Jan. 14, 2016

(65) Prior Publication Data
US 2017/0163329 A1  Jun. 8, 2017

(30) Foreign Application Priority Data
Jul. 11, 2014  (FR) ...................... 14 56691

(51) Int. Cl.
*H04B 7/14* (2006.01)
*H04J 3/08* (2006.01)
(Continued)

(52) U.S. Cl.
CPC ........... *H04B 7/14* (2013.01); *H04L 12/2834* (2013.01); *H04L 12/66* (2013.01); *H04L 43/12* (2013.01); *H04W 88/16* (2013.01)

(58) Field of Classification Search
CPC ..... H04L 12/2834; H04L 12/66; H04L 43/12; H04B 7/14; H04W 88/16
See application file for complete search history.

(56) References Cited

U.S. PATENT DOCUMENTS

2008/0273547 A1    11/2008  Phinney
2011/0295102 A1*   12/2011  Lakkis ..................... A61B 5/00
                                                          600/407
(Continued)

OTHER PUBLICATIONS

International Search Report for PCT/EP2015/065446 dated Sep. 14, 2015, 2 pages.

*Primary Examiner* — Maharishi V Khirodhar
(74) *Attorney, Agent, or Firm* — Nixon & Vanderhye P.C.

(57) ABSTRACT

A residential gateway wirelessly receives a message from a terminal device. The residential gateway forms part of a communication system comprising a plurality of residential gateways connected to a server for which said message is intended. The residential gateway determines whether said terminal device has previously been paired with said residential gateway. If such is the case, the residential gateway wirelessly transmits an acknowledgement to the terminal device and propagates the message to the server. Otherwise the residential gateway activates a timer of predetermined duration at the end of which, when no wirelessly-transmitted acknowledgement of said message has been detected, the residential gateway wirelessly transmits an acknowledgement to the terminal device and propagates the message to the server.

15 Claims, 4 Drawing Sheets

Figure 1:
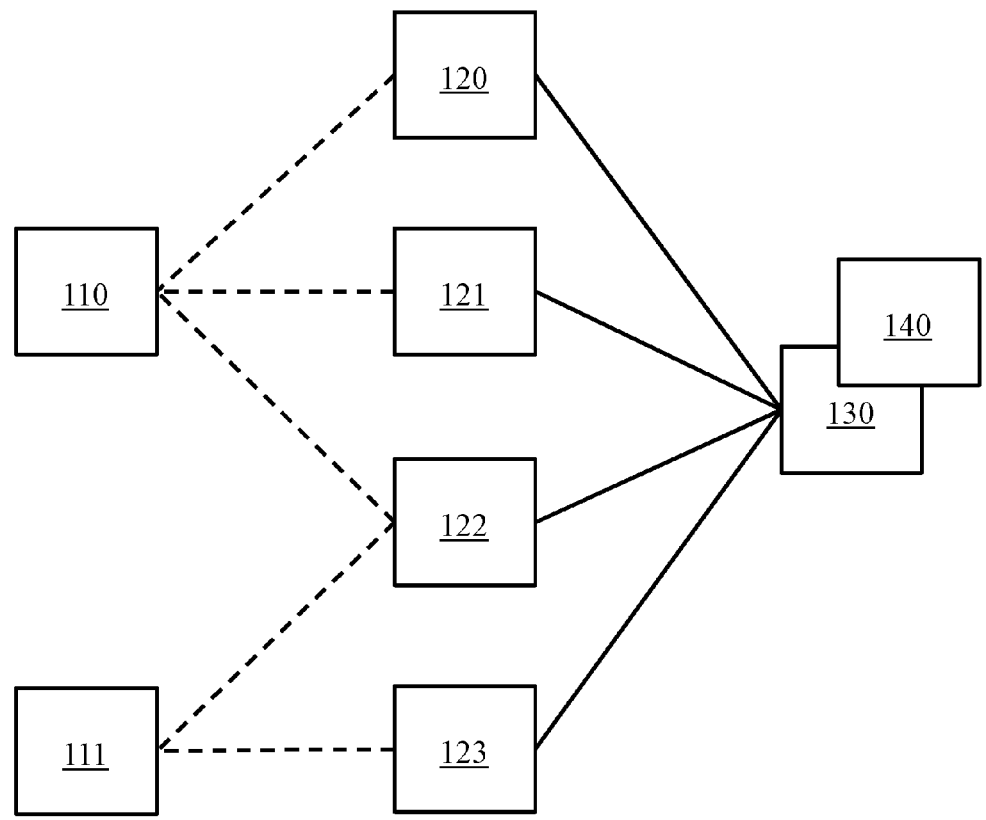

(51) Int. Cl.
*H04L 12/28* (2006.01)
*H04L 12/66* (2006.01)
*H04L 12/26* (2006.01)
*H04W 88/16* (2009.01)

(56) References Cited

U.S. PATENT DOCUMENTS

| | | |
|---|---|---|
| 2012/0185268 A1 | 7/2012 | Wiesner et al. |
| 2014/0029411 A1* | 1/2014 | Nayak ............... H04L 41/0654 370/219 |
| 2014/0292503 A1* | 10/2014 | Schoenberg ...... B60R 21/01556 340/438 |
| 2015/0215925 A1* | 7/2015 | Wang .................. A61B 5/0024 370/329 |

* cited by examiner

RELAY RESIDENTIAL GATEWAY BETWEEN A TERMINAL DEVICE AND A SERVER

This application is the U.S. national phase of International Application No. PCT/EP2015/065446 filed Jul. 7, 2015 which designated the U.S. and claims priority to FR Application No. 1456691 filed Jul. 11, 2014, the entire contents of each of which are hereby incorporated by reference.

The present invention relates to residential gateways used as relays for messages transmitted by terminal devices to a gathering server in the context of the Internet of Things.

The Internet of Things is under development. The Internet of Things represents the extension of the Internet to things and places in the physical world. Whereas the Internet is not normally extended beyond the electronic world, the Internet of Things represents exchanges of information and data coming from devices present in the real world to the Internet, such as for example for gathering electrical consumption or water consumption readings. The Internet of Things is considered to be the third development of the Internet, referred to as Web 3.0. The Internet of Things is partly responsible for the current increase in the volume of data to be transmitted and stored and is thus at the origin of what is called "Big Data". The Internet of Things takes on a universal character for designating objects connected to various uses, for example in the field of e-health or home automation.

A first approach adopted for interconnecting objects, referred to as communicating objects, in the context of the Internet of Things, relies on a deployment, controlled by an operator, of gathering gateways situated on geographically high points. Apart from maintenance operations, these gateways are fixed and permanent. In this model, mention can for example be made of the SigFox or ThingPark networks. For example, in France, the SigFox network relies on high points of TDF (Télédiffusion de France) transmission sites. These gathering gateways communicate with the communicating objects by means of medium- or long-range radio communication systems (e.g. the Semtech LoRa system). This approach relies on a limited number of gathering gateways (difficulty in deploying new network infrastructures) as well as a reliable and secure uplink access with one or more gathering servers. This first approach suffers from problems of blank areas (namely geographical areas that are not covered, for example because of the terrain topology in the vicinity of the high point where a gathering gateway is installed), load (at the gathering gateways and servers) and operating costs.

A second approach consists of connecting communicating objects through residential gateways. Mention can be made for example of the Energy Gateway technology. A system according to the Energy Gateway technology is composed of two distinct parts: firstly a residential gateway and peripheral sensors, which are hosted at the consumer premises and allow gathering information, transmitting this information to a gathering server, and controlling the triggering of various actions (control of the switching on of the radiators or water heater for example); secondly, the gathering server that makes available the received information and transmits commands for controlling the triggering of various actions. This gathering server is accessible via the Internet. The radio technologies used for communicating with the communicating objects according to the second approach are of relatively short range (for example of the Zigbee, Bluetooth or Wi-Fi type) for serving a local gathering restricted to the objects in the dwelling. This second approach suffers from: an unreliable uplink access (access via the Internet) not allowing the establishment of high-quality SLA (Service Label Agreement) services, and weak coverage related to the radio technology used for connecting the communicating objects to the residential gateway. Providing residential gateways with longer-range radio technologies for communicating with the communicating objects, such as those used in the context of the first approach, is conceivable. Deployment of the network would thus be facilitated (for example by integrating these functionalities in the residential gateway associated with the Internet access provider) but this poses problems of network management because of the potential density of these residential gateways (compared with the deployment of the gathering gateways of the first approach), which would mean that the same communicating object would be within range of a large number of residential gateways, and the problem of reliability of the uplink (access via the Internet) would remain.

It is desirable to overcome these drawbacks of the prior art. It is in particular desirable to provide a solution that enables ensuring that a message transmitted by a terminal device, considered to be a communicating object within the meaning of the Internet of Things, is actually relayed up to a gathering server, while limiting the consumption of network resources for providing such a relay.

The invention relates to a method for relaying a message wirelessly received by a residential gateway from a terminal device, said residential gateway forming part of a communication system comprising a plurality of residential gateways connected to a server for which said message is intended. The method is such that said residential gateway performs the following steps: determining whether said terminal device has previously been paired with said residential gateway; when said terminal device has previously been paired with said residential gateway, wirelessly transmitting to said terminal device an acknowledgement of said received message and propagating said received message to said server; and, when said terminal device has not previously been paired with said residential gateway, activating a timer of predetermined duration at the end of which, when no wirelessly-transmitted acknowledgement of said message has been detected, said residential gateway wirelessly transmits to said terminal device an acknowledgement of said received message and propagates said received message to said server. Thus the message transmitted by the terminal device is actually relayed up to the gathering server, while limiting the consumption of network resources for providing this relay since the timer ensures that, when said residential gateway is not paired with said terminal device, said residential gateway waits to see whether an acknowledgement (which must typically be sent by the residential gateway paired with said terminal device) has been transmitted before itself relaying said message.

According to a particular embodiment, said residential gateway randomly determines the duration of said timer between a lower bound and an upper bound, the lower bound defining a maximum theoretical lapse of time between the reception by a residential gateway of a message generated by a terminal device and the transmission of an acknowledgement of said message by the residential gateway with which said terminal device is paired, the upper bound defining a maximum theoretical lapse of time between the reception by a residential gateway of a message generated by a terminal device and the transmission of an acknowledgement of said message by a residential gateway with which said terminal device is not paired. Thus, when the message is received by a plurality of residential gateways, said message is actually relayed only once, thus limiting the consumption of network resources for relaying said message up to the server.

According to a particular embodiment, said residential gateway initiates a procedure of sending probes comprising the following steps: selecting a set of radio transmission parameters from a predefined collection of sets of radio transmission parameters; performing a sending of at least one probe using said selected set of transmission parameters; and reiterating the sending using another set of parameters, until the entire collection of sets of radio transmission parameters has been used, or until a connectivity management device interrupts said procedure of sending probes. Thus the procedure of sending probes enables testing an entire collection of sets of transmission parameters, at least until the connectivity management device has sufficient elements for performing the necessary transmission configuration actions.

According to a particular embodiment, said residential gateway triggers the procedure of sending probes following an instruction coming from a connectivity management device of the communication system, or said residential gateway periodically triggers the procedure of sending probes, or said residential gateway triggers the procedure of sending probes following a phase of connection of said residential gateway to the server.

According to a particular embodiment, following the procedure of sending probes, said residential gateway receives radio transmission parameters to be enforced to each terminal device paired with said residential gateway for wirelessly transmitting messages intended for said server. Thus it is possible to adjust the radio transmission parameters used by terminal devices paired with said residential gateway so that the number of residential gateways that can be wirelessly reached is sufficient to ensure redundancy of potential paths for relaying said message to the server and is limited so as to avoid an excessively large number of residential gateways attempting to relay said message to the server.

According to a particular embodiment, said radio transmission parameters are transmit-power and/or spreading-factor parameters.

According to a particular embodiment, following reception of a probe, said residential gateway performs the following steps: determining quality of reception of said probe; determining radio transmission parameters that have been used to transmit said probe; and transmitting, to a connectivity management device of the communication system, a transmission quality report including information representing the quality of reception of said probe and radio transmission parameters that have been used to transmit said probe. Thus the connectivity management device is capable of determining a transmission quality level between residential gateways according to sets of radio transmission parameters.

According to a particular embodiment, upon reception of transmission quality reports, the connectivity management device of the communication system performs the following steps: determining which set of radio transmission parameters used by a residential gateway in the context of a procedure of sending probes enables said residential gateway to communicate with a number of other residential gateways higher than and as close as possible to a predefined number of residential gateways; and transmitting to said residential gateway the determined set of radio transmission parameters so as to enforce said set of parameters to each terminal device paired with said residential gateway. Thus the connectivity management device adjusts the radio transmission parameters used by terminal devices so that the number of residential gateways that can be wirelessly reached is sufficient for ensuring redundancy of potential paths for performing a message relay up to the server and is limited so as to avoid an excessively large number of residential gateways attempting to relay the same message to the server.

According to a particular embodiment, the connectivity management device of the communication system determines a representative transmission map and, upon detection of a disconnection of a residential gateway from the communication system, the connectivity management device of the communication system performs the following steps: selecting, according to the transmission map, a temporary replacement residential gateway for temporarily replacing, in terms of pairing, said disconnected residential gateway with at least one determined terminal device; and informing said temporary replacement residential gateway of the temporary pairing with each determined terminal device. Thus it is possible to mitigate a temporary disconnection of a residential gateway vis-à-vis terminal devices that are paired therewith.

According to a particular embodiment, upon detection of a reconnection in the communication system of the previously disconnected residential gateway, the connectivity management device of the communication system cancels the temporary pairing and informs said temporary replacement residential gateway thereof.

The invention also relates to a residential gateway adapted for acting as a relay of a message wirelessly received from a terminal device, said residential gateway being intended to form part of a communication system comprising a plurality of residential gateways connected to a server for which said message is intended. Said residential gateway is such that it comprises: first means for determining whether said terminal device has previously been paired with said residential gateway; second means for wirelessly transmitting to said terminal device an acknowledgement of said message received and propagating said message received to said server; and third means for activating a timer of predetermined duration upon reception of said message. Said residential gateway is further such that said third means are activated when said terminal device has not previously been paired with said residential gateway, and such that said second means are activated when said terminal device has previously been paired with said residential gateway, and also when no wirelessly-transmitted acknowledgement of said message has been detected at the end of said timer.

The invention also relates to a computer program that can be stored on a medium and/or downloaded from a communication network, in order to be read by a processor. This computer program comprises instructions for implementing the method mentioned above, when said program is executed by the processor. The invention also relates to storage means comprising such a computer program.

Figure 2:
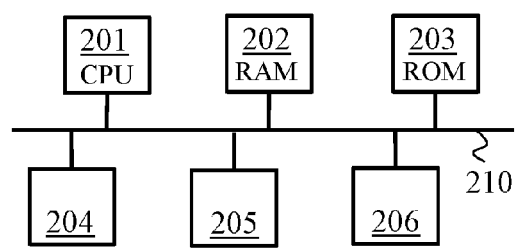
Figure 3:
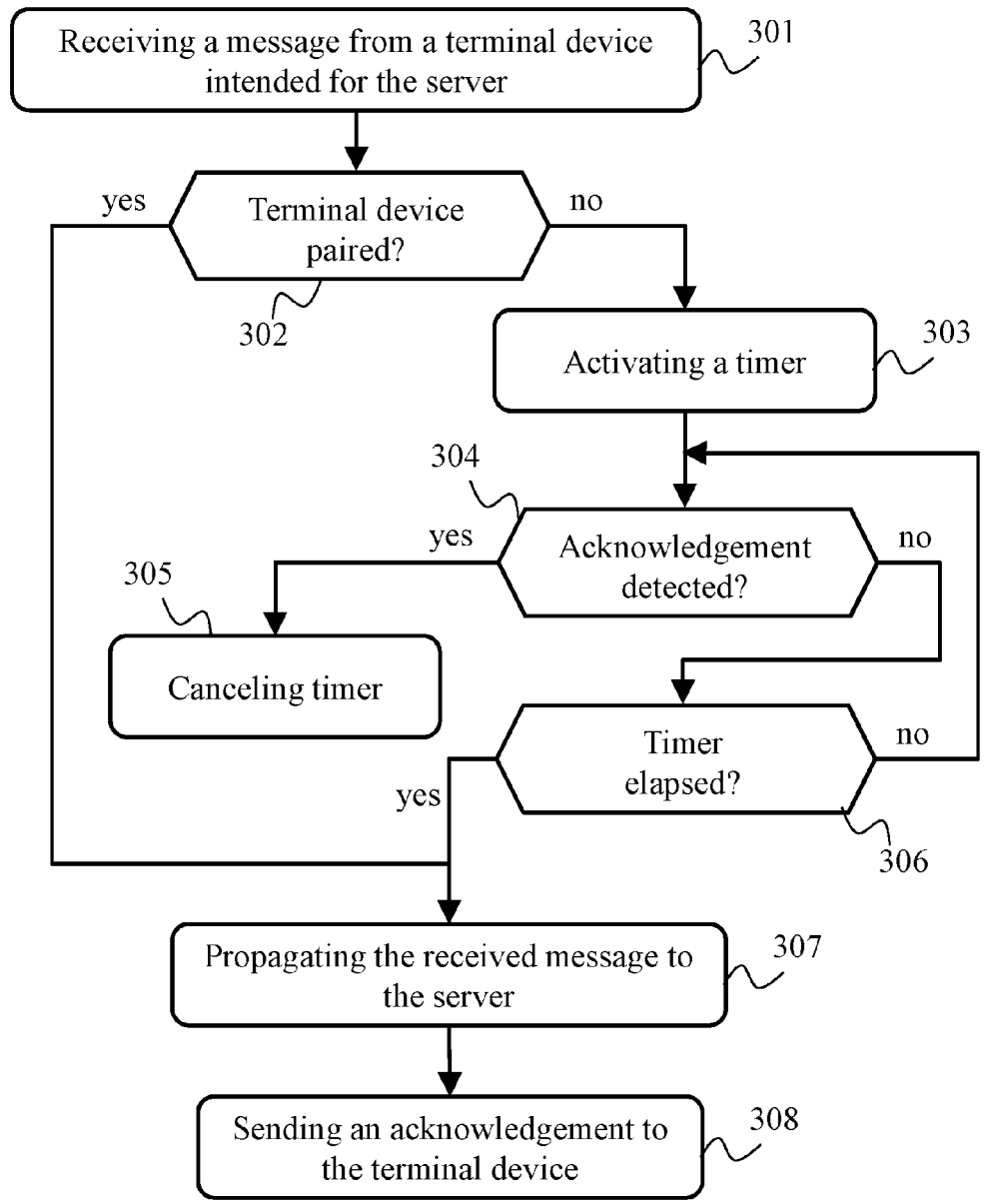
Figure 4:
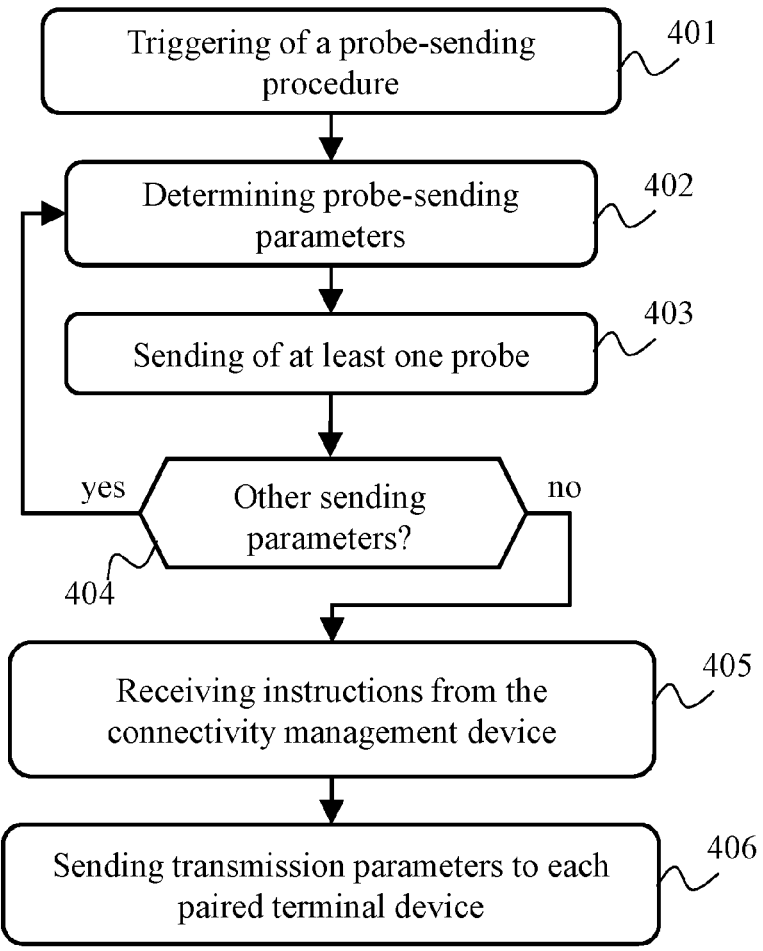
Figure 5:
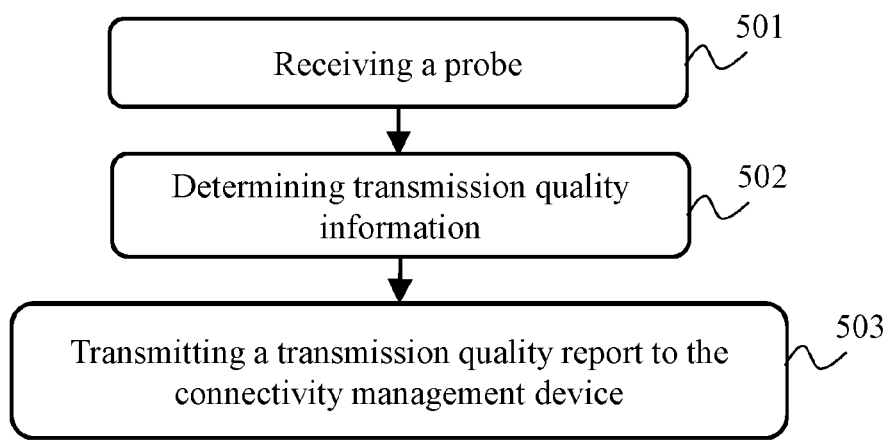
Figure 6:
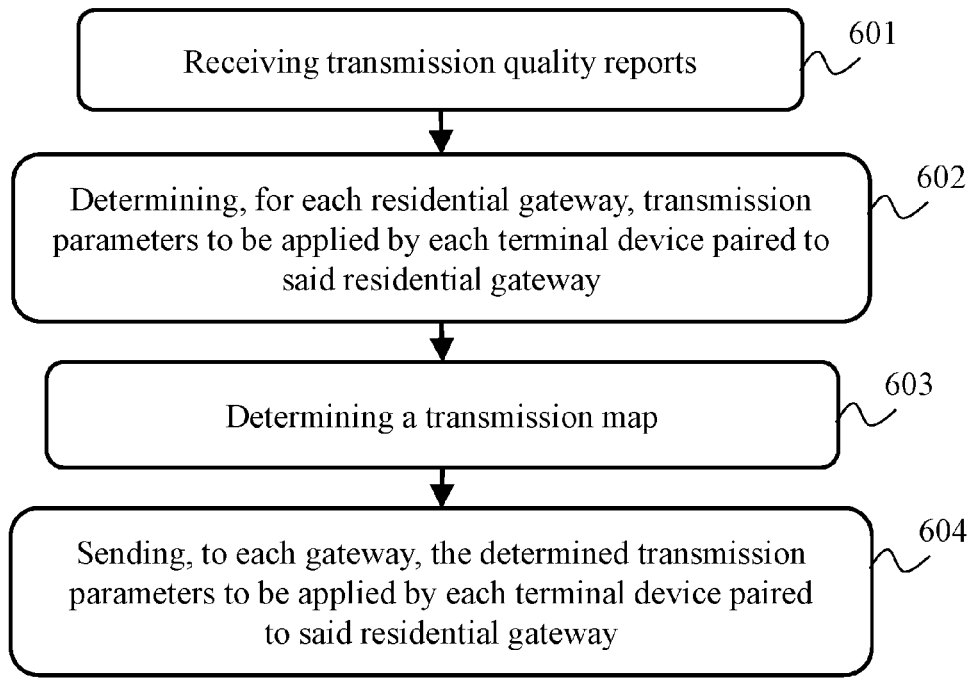
Figure 7:
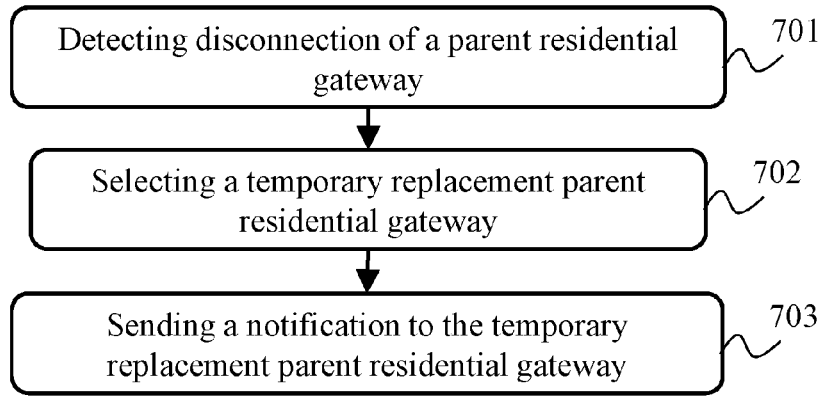
Figure 8:
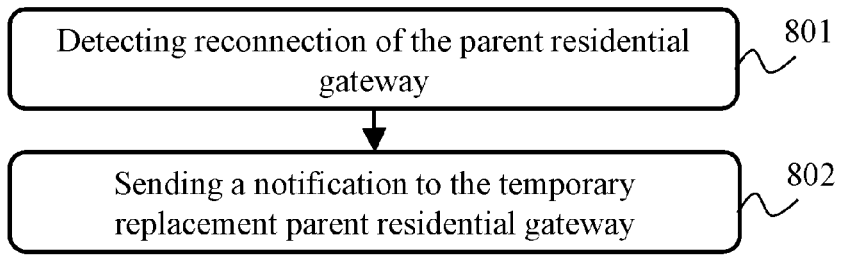

The features of the invention mentioned above, as well as others, will emerge more clearly from a reading of the following description of an example embodiment, said description being given in relation to the accompanying drawings, among which:

FIG. 1 schematically illustrates a communication system in which the present invention can be implemented;

FIG. 2 schematically illustrates an example of hardware architecture of a residential gateway and/or of a connectivity management device of the communication system of FIG. 1;

FIG. 3 schematically illustrates an algorithm used by at least one residential gateway of the communication system of FIG. 1 for processing messages coming from a terminal device and intended for the server;

FIG. 4 schematically illustrates an algorithm used by at least one residential gateway of the communication system of FIG. 1 for initiating a mechanism for adjusting the transmission of at least one terminal device;

FIG. 5 schematically illustrates an algorithm used by at least one residential gateway of the communication system of FIG. 1 for using the mechanism for adjusting the transmission of at least one terminal device;

FIG. 6 schematically illustrates an algorithm used by the connectivity management device of the communication system in FIG. 1 for adjusting the transmission of at least one terminal device;

FIG. 7 schematically illustrates an algorithm used by the connectivity management device of the communication system in FIG. 1, for performing a temporary pairing between at least one terminal device and a residential gateway of the communication system of FIG. 1; and FIG. 8 schematically illustrates an algorithm used by the connectivity management device of the communication system in FIG. 1, for cancelling a temporary pairing between at least one terminal device and a residential gateway of the communication system of FIG. 1.

FIG. 1 schematically illustrates a communication system in which the present invention can be implemented.

The communication system comprises a plurality of residential gateways 120, 121, 122, 123. Each residential gateway 120, 121, 122, 123 has a respective communication link with a server 130. According to a particular embodiment, each residential gateway 120, 121, 122, 123 includes a function of access to the Internet and the communication link between said residential gateway and the server 130 is based on the IP protocol (Internet Protocol as defined in the standard document RFC 791).

Each residential gateway 120, 121, 122, 123 has at least one radio interface enabling said residential gateway to communicate with at least one terminal device 110, 111. Said radio interface is for example in accordance with Semtech's LoRa system. Said radio interface is, according to another example, of Wi-Fi type. Said radio interface is such that a terminal device can be within radio communication range with a plurality of residential gateways.

In the communication system, messages shall be sent from each terminal device 110, 111 to the server 130. The server 130 has a role of collecting information available from the terminal devices 110, 111. The residential gateways 120, 121, 122, 123 have a role of relay between the terminal devices 110, 111 and the server 130. For example, in FIG. 1, the residential gateways 120, 121, 122 are within radio communication range of the terminal device 110 and can serve as relays for messages generated by the terminal device 110 intended for the server 130, and the residential gateways 122, 123 are within radio communication range of the terminal device 111 and can serve as relays for messages generated by the terminal device 111 intended for the server 130. The behaviour of the residential gateways 120, 121, 122, 123 vis-à-vis messages generated by the terminal devices 110, 111 intended for the server 130 is detailed below in relation to FIG. 3.

The communication system preferentially comprises a connectivity management device 140 responsible for determining radio transmission parameters to be enforced to the terminal devices 110, 111 according to a transmission map representing the connectivity in the communication system in FIG. 1. These radio transmission parameters define the radio communication range of said terminal devices 110, 111, and are preferentially parameters representing transmit power P and/or spreading factor SF. To enable thus adjusting the number of residential gateways that are able to act in the relaying of messages generated by each terminal device 110, 111 and intended for the server 130, the transmission map is established by the connectivity management device 140 by sending probes. The behaviour of the residential gateways 120, 121, 122, 123 vis-à-vis the sending of said probes is detailed below in relation to FIG. 4. The behaviour of the residential gateways 120, 121, 122, 123 vis-à-vis the reception of said probes is detailed below in relation to FIG. 5. The behaviour of the connectivity management device 140 for generating the transmission map is detailed below in relation to FIG. 6.

The connectivity management device 140 may be included in the server 130. The connectivity management device 140 may be distinct from the server 130 and each residential gateway 120, 121, 122, 123 has a communication link with the connectivity management device 140.

The functionalities of the connectivity management device 140 may also be distributed between the residential gateways 120, 121, 122, 123. In other words, each of the residential gateways 120, 121, 122, 123 itself defines the radio transmission parameters to be enforced to each terminal device that is paired therewith, according to a partial representation of the transmission map.

For ensuring the relaying of the messages generated by the terminal devices 110, 111 toward the server 130 while avoiding unnecessary message redundancies, terminal devices are paired with respective residential gateways. It is then said that the residential gateway is a parent residential gateway vis-à-vis said terminal device, and that the terminal device is a child terminal device vis-à-vis said residential gateway. As detailed below in relation to FIG. 3, the behaviour of each residential gateway 120, 121, 122, 123 vis-à-vis messages received from a terminal device depends on whether or not said residential gateway is paired with said terminal device. Default pairing is previously performed between each terminal device 110, 111 and a residential gateway. When a residential gateway establishes a connection with the server 130, said residential gateway informs the server 130 and/or the connectivity management device 140 of each terminal device that is paired therewith. If a change in pairing occurs while the connection with the server 130 is established, said residential gateway informs the server 130 and/or the connectivity management device 140 thereof. This in particular enables the connectivity management device 140 to choose when needed temporary replacement parent residential gateways, as described hereinafter in relation to FIGS. 7 and 8. Indeed, in a particular embodiment, in the event of detection of an abnormality in communication with said residential gateway, the connectivity management device 140 selects, for each concerned child terminal device, a temporary replacement residential gateway. Let us consider hereinafter that the terminal device 110 is previously paired with the residential gateway 120 and that the terminal device 111 is previously paired with the residential gateway 122.

The pairing between each terminal device 110, 111 and a residential gateway can be performed in advance in factory, for example when said residential gateway is supplied in the form of a batch with one or more terminal devices. This pairing may also be dynamically performed by a user or an installer of said residential gateway. For example, by pressing on a button on the terminal device and on a button on said residential gateway, said terminal device and said residential gateway exchange messages leading to pairing, in accordance with a principle similar to the PBM (Push-Button Method) used in the context of the WPS (Wi-Fi Protected Setup) standard. Other pairing methods may be used, such as for example entry of a serial number of the terminal device with said residential gateway or reading of a barcode representing said serial number, this serial number then being notified by said terminal device in each message generated by said terminal device.

FIG. 2 schematically illustrates an example of hardware architecture of a residential gateway of the communication system in FIG. 1 and/or of the connectivity manager 140. Let us consider that FIG. 2 represents a hardware architecture of the residential gateway 122. The residential gateway 122 then comprises, connected by a communication bus 210: a processor or CPU (Central Processing Unit) 201, a Random Access Memory (RAM) 202; a Read Only Memory (ROM) 203; a storage unit or a storage medium reader, such as an SD (Secure Digital) card reader 204 or a Hard Disk Drive (HDD); a first communication interface 205 enabling connecting the residential gateway 122 to one or more terminal devices; and a second communication interface 206 enabling connecting the residential gateway 122 to the server 130 and preferentially to the connectivity management device 140.

The processor 201 is capable of executing instructions loaded into the RAM 202 from the ROM 203, from an external memory, from a storage medium or from a communication network. When the residential gateway 122 is powered up, the processor 201 is capable of reading instructions from the RAM 202 and executing them. These instructions form a computer program causing the implementation, by the processor 201, of all or some of the algorithms and steps described herein in relation to the residential gateway 122 (or respectively in relation to the connectivity management device 140).

Thus all or some of the algorithms and steps described herein may be implemented in software form by execution of a set of instructions by a programmable machine, such as a DSP (Digital Signal Processor) or a microcontroller. All or some of the algorithms and steps described herein may also be implemented in hardware form by a machine or a dedicated component, such as an FPGA (Field-Programmable Gate Array) or an ASIC (Application-Specific Integrated Circuit).

The server 130 and/or the terminal devices 110, 111 may be constructed on the basis of an architecture similar to that presented in FIG. 2.

FIG. 3 schematically illustrates an algorithm implemented by at least one residential gateway in the communication system of FIG. 1, to process messages coming from a terminal device and intended for the server 130. Let us consider by way of illustration that the algorithm in FIG. 3 is implemented by the residential gateway 122.

In a step 301, the residential gateway 122 receives a message coming from a terminal device and intended for the server 130. Referring to FIG. 1, the residential gateway 122 is within communication range of the terminal device 110 and of the terminal device 111. The received message may then have been generated by the terminal device 110 or by the terminal device 111.

In a following step 302, the residential gateway 122 determines whether the terminal device that generated the message received at the step 301 is paired (whether a prior pairing or a temporary pairing) with said residential gateway. If such is the case, a step 307 is performed; otherwise a step 303 is performed. When the algorithm in FIG. 3 is implemented by the residential gateway 122 vis-à-vis a message received from the terminal device 111 that was previously paired with the residential gateway 122, the residential gateway 122 therefore performs the step 307. When the algorithm in FIG. 3 is implemented by the residential gateway 122 vis-à-vis a message received from the terminal device 110 that was previously paired with the residential gateway 120, the residential gateway 122 therefore performs the step 303.

In the step 303, the residential gateway 122 activates a timer of a predetermined duration. The duration of said timer may be predefined, for example in factory, and potentially common to all the residential gateways in the communication system in FIG. 1. The duration of said timer may be determined dynamically by the residential gateway 122 in a random fashion between a lower bound and an upper bound. The lower bound defines a maximum theoretical lapse of time between the reception by a residential gateway of a message generated by a terminal device and the transmission of an acknowledgment of said message, intended for said terminal device, by a residential gateway with which said terminal device is paired. The upper bound defines the maximum theoretical lapse of time between the reception by a residential gateway of a message generated by a terminal device and the transmission of an acknowledgement of said message, intended for said terminal device, by a residential gateway with which said terminal device is not paired. As detailed below, when the residential gateways in the communication system in FIG. 1 randomly determine the duration of said timer, this allows limiting unnecessary redundancies of messages intended for the server 130. The consumption of bandwidth to this server 130 is improved thereby.

In a following step 304, the residential gateway 122 checks whether the residential gateway 122 has detected a transmission of an acknowledgement of the message received at the step 301. This acknowledgement is supposed, in nominal operation, to be transmitted by the residential gateway 120 with which the terminal device 110 is paired. This acknowledgement may be sent by a residential gateway that replaced the residential gateway 120 in its role of relay to the server 130. If the residential gateway 122 has detected a transmission of such an acknowledgement, a step 305 is performed; otherwise a step 306 is performed.

In a the step 305, the residential gateway 122 cancels the timer activated at the step 303, and the algorithm in FIG. 3 is ended until another message coming from a terminal device and intended for the server 130 is received. This means that the message received at the step 301 is considered to be relayed up to the server 130, by a residential gateway other than the residential gateway 122.

In the step 306, the residential gateway 122 checks whether the timer activated at the step 303 has elapsed. If such is the case, the step 307 is performed; otherwise the step 304 is reiterated.

In the step 307, the residential gateway 122 propagates, to the server 130, the message received at the step 301. The residential gateway 122 then preferentially supplies to the server 130 an indication according to which the residential gateway 122 has propagated said message, to enable the server 130 to detect whether or not said message was relayed by the residential gateway with which said terminal device is paired.

In a step 308, the residential gateway 122 sends, to said terminal device, an acknowledgement of said message received at the step 301, and then the algorithm in FIG. 3 is ended. In other words, the acknowledgement of said message received at the step 301 is supposed to be sent by the residential gateway with which said terminal device is paired and, if a predetermined period has elapsed without transmission of said acknowledgement, another residential gateway within communication range of said terminal device takes the role of relay for said message up to the server 130. According to the duration of timer used by each other residential gateway within communication range of said terminal device, said message may be relayed several times up to the server 130. Using a random definition of this duration of timer allows limiting, or even preventing, said message being relayed several times to the server 130 and/or said terminal device receiving a plurality of acknowledgements vis-à-vis said message.

Implementing in residential gateways this method for reacting to an absence of acknowledgement allows using simple terminal devices that do not seek themselves to determine how to relay their messages to the server 130. Indeed, in the case of sensors intended for domestic use (e.g. smoke detector, intrusion detector, etc.), these terminal devices must remain simple to implement.

It should be noted that the steps 307 and 308 may be reversed. It should also be noted that the residential gateway 122 may perform the step 308 after having received, from the server 130, a corresponding instruction. Thus, when said message is relayed several times to the server 130, the server 130 chooses a residential gateway, among those that relayed said message, to transmit the acknowledgement to said terminal device and instructs said chosen residential gateway to transmit the acknowledgement to said terminal device. The terminal device then receives only one acknowledgement vis-à-vis said message. In addition, this ensures that the server 130 has actually received the message when the connections respectively established between the residential gateways and the server 130 are not reliable. When the acknowledgement is sent without awaiting confirmation from the server 130, this enables the communication system to dispense with a variable round-trip time between the residential gateways and the server 130.

FIG. 4 schematically illustrates an algorithm implemented by at least one residential gateway in the communication system in FIG. 1 to initiate a mechanism for adjusting the transmission of at least one terminal device paired with said residential gateway. Let us consider by way of illustration that the algorithm in FIG. 4 is implemented by the residential gateway 122.

In a step 401, the residential gateway 122 triggers a procedure of sending probes. Such probes are test messages intended to be broadcast by the residential gateway 122 to other residential gateways in the communication system in FIG. 1. The triggering of the procedure of sending probes may follow an instruction coming from the connectivity management device 140 wishing to construct the transmission map or to check the relevance of a previously constructed version of the transmission map. The triggering of the procedure sending probes may also be periodic. The triggering of the procedure of sending probes may also follow a phase of connection of the residential gateway 122 to the server 130, for example during a more general phase of initialisation of the residential gateway 122.

In a following step 402, the residential gateway 122 determines parameters for the radio transmission of a probe defining the communication range of the residential gateway 122 in this context. These parameters preferentially represent transmit power P and/or spreading factor SF. The principle of the algorithm in FIG. 4 is to have the residential gateway 122 test a predefined collection of sets of transmission parameters that define respective radio communication ranges. In the step 402, the residential gateway 122 therefore selects one set of transmission parameters from said collection.

In a following step 403, the residential gateway 122 sends at least one probe by applying the transmission parameters determined at the step 402. To do so, the residential gateway 122 uses the same radio communication interface as the one used for communicating with the terminal devices. When another residential gateway in the communication system in FIG. 1 receives one or more of these probes, said other residential gateway generates a transmission quality report intended for the connectivity management device 140, as described below in relation to FIG. 5. Each probe sent preferentially contains information representing radio transmission parameters used by the residential gateway 122, more particularly when said parameters represent transmit power P. Indeed, when said parameters represent a spreading factor SF, said spreading factor may be intrinsically determined by said other residential gateway without the residential gateway 122 having indicated the spreading factor SF used for sending said probe.

In a following step 404, the residential gateway 122 determines whether there exist other radio transmission parameters to be tested. In other words, the residential gateway 122 determines whether at least one set of radio transmission parameters remains to be tested among the collection of sets of radio transmission parameters. If such is the case, the step 402 is reiterated with a set of radio transmission parameters that has not yet been tested; otherwise a step 405 is performed.

For example, the residential gateway 122 runs through the predefined collection of sets of transmission parameters so as to increase, along with the executions of the step 402, the range of the radio transmissions. According to another example, the residential gateway 122 runs through the predefined collection of sets of transmission parameters so as to decrease, along with the executions of the step 402, the range of the radio transmissions.

In the step 405, the residential gateway 122 ends the probe-sending procedure. The residential gateway 122 awaits instructions from the connectivity management device 140, and receives said instructions from the connectivity management device 140. The definition and transmission of these instructions by the connectivity management device 140 are described below in relation to FIG. 6. These instructions relate to transmission parameterising of each terminal device paired with the residential gateway 122, insofar as said terminal device is capable of adjusting the transmission parameters that said terminal device uses for wirelessly transmitting messages to the server 130.

In a following step 406, the residential gateway 122 executes the instructions received at the step 403 from the connectivity management device 140 and thus sends, to each terminal device paired with the residential gateway 122, transmission parameters to be enforced for the radio transmission of messages to the server 130. As before, these transmission parameters preferentially represent transmit power P and/or spreading factor SF. Next the algorithm in FIG. 4 is ended. The residential gateway 122 may defer the updating of the transmission parameters with the terminal devices that are paired therewith. The residential gateway 122 may in particular take advantage of a subsequent exchange of messages between a terminal device that is paired therewith and said residential gateway 122. This may allow avoiding bringing said terminal device out of a standby mode in order merely to apply new transmission parameters, and thus allow saving on energy resources from the point of view of said terminal device, which is particularly advantageous when said terminal device is power-supplied by a cell or cells or battery or batteries (e.g. sensor, etc). The residential gateway 122 may also apply the transmission parameters received from the connectivity management device 140 during subsequent phases of pairing with terminal devices, whether for terminal devices for which said residential gateway 122 becomes the default parent residential gateway or for which said residential gateway 122 adopts a role of temporary replacement parent residential gateway.

The probe-sending procedure described above in the context of the algorithm in FIG. 4 makes provision for testing a whole collection of transmission parameters. It is however possible for the connectivity management device 140 to have sufficient information, via transmission quality reports generated as described below in relation to FIG. 5, to make a decision as to the transmission parameterising to enforce, although said collection of transmission parameters has not yet been completely tested. The connectivity management device 140 may then send a message to the concerned residential gateway in order to interrupt the probe-sending procedure.

FIG. 5 schematically illustrates an algorithm used by at least one residential gateway in the communication system in FIG. 1 to implement a mechanism for adjusting the transmission of at least one terminal device. Let us consider by way of illustration that the algorithm in FIG. 5 is implemented by the residential gateway 122.

In a step 501, the residential gateway receives a probe. To do this, the residential gateway 122 uses the same radio communication interface as the one used for communicating with the terminal devices. Such a probe was sent by another residential gateway in the context of the probe-sending procedure previously described in relation to FIG. 4.

In a following step 502, the residential gateway 122 determines information representing a transmission quality of said probe. This information represents for example a received signal power level RSSI (received signal strength indication) or a data loss rate (e.g. the residential gateway 122 waits until it receives a predetermined quantity of probes per set of radio transmission parameters and compares it with a quantity of probes actually received for this set of radio transmission parameters.

In a following step 503, the residential gateway 122 generates a transmission quality report and transmits said generated report to the connectivity management device 140. Said transmitted report includes information representing the residential gateway that transmitted the received probe or probes, information representing the residential gateway 122 that generated said report, information representing the set of transmission parameters used for the wireless sending of each probe, and information representing said transmission quality for said set of radio transmission parameters. The algorithm in FIG. 5 is next ended.

FIG. 6 schematically illustrates an algorithm implemented by the connectivity management device 140 for adjusting the transmission of at least one terminal device.

In a step 601, the connectivity management device 140 receives at least one transmission quality report relating to a probe-sending procedure initiated by a residential gateway in the communication system in FIG. 1, as previously described in relation to FIG. 4. Each transmission quality report is sent by another residential gateway in the communication system in FIG. 1 that received at least one probe sent in the context of said probe-sending procedure. From such transmission quality reports, the connectivity measurement device 140 is capable of determining, for each set of radio transmission parameters used by a residential gateway in the context of a probe-sending procedure, which other residential gateway is within communication range of said residential gateway.

In a following step 602, the connectivity management device 140 determines, for each residential gateway that initiated such a probe-sending procedure, transmission parameters to be applied by each terminal device paired with said residential gateway, insofar as said terminal device is capable of adjusting the transmission parameters that said terminal device uses for wirelessly transmitting messages toward the server 130. As already mentioned, these parameters define the radio communication range of the terminal devices and are preferentially parameters representing transmit power P and/or spreading factor SF.

The radio transmission parameters to be applied by each terminal device paired with said residential gateway are such that a predefined number N of other residential gateways are within radio communication range of said residential gateway that initiated the probe-sending procedure. The probe-sending procedure relies on the same radio communication interfaces as those respectively used by the residential gateways of the communication system in FIG. 1 for communicating with the terminal devices. The geographical position of the terminal devices paired with a residential gateway of the communication system in FIG. 1 and the geographical position of said residential gateway are considered to be sufficiently close for the transmission parameters used by said residential gateway during a probe-sending procedure to be applied by said terminal devices for obtaining a radio communication range that is substantially identical vis-à-vis other residential gateways in the communication system in FIG. 1. The connectivity management device 140 may however apply a correction factor to the radio transmission parameters used by said residential gateway during the probe-sending procedure, to determine the radio transmission parameters to be applied by each terminal device paired with said residential gateway, said correction factor aiming to take into account a difference in geographical position between said residential gateway and the terminal devices that are paired therewith.

In other words, the connectivity measurement device 140 is capable of determining, from transmission quality reports received following a probe-sending procedure initiated by a residential gateway, which transmission parameters enable to wirelessly reach the predefined number N of other residential gateways. The connectivity management device 140 seeks to select the set of transmission parameters for which said residential gateway is capable of wirelessly reaching a number N' of other residential gateways as close as possible to the number N, N' preferably being equal to N or, failing that, greater than N. Using radio transmission parameters as close as possible to the number N allows ensuring the redundancy necessary for making the relaying of messages to the server 130 reliable, while limiting the number of residential gateways acting in competition vis-à-vis said messages. In addition, this allows limiting energy consumption of the terminal devices, which increases their service lifetime when said terminal devices are operating on a cell or cells or battery or batteries. This also allows reducing radio interference and pollution.

If no set of transmission parameters enables said residential gateway to wirelessly reach the predefined number N of other residential gateways, the set of transmission parameters with a maximum radio range is adopted.

In a following step 603, the connectivity management device 140 determines the transmission map applicable to the residential gateways in the communication system in FIG. 1 according to the transmission parameters adopted at the step 602. The transmission map represents, according to the transmission parameters adopted vis-à-vis each residential gateway in the communication system in FIG. 1 and therefore each terminal device paired with each said residential gateway, the connectivity of the communication system in FIG. 1, namely the communication capacities in the communication system in FIG. 1.

This transmission map enables the connectivity management device 140 to detect any requirements to trigger probe-sending procedures and/or any requirements to select temporary replacement parent residential gateways and/or any requirements to cancel selections of temporary replacement parent residential gateways, according to detection of disconnection or reconnection of residential gateways and/or changes in transmission conditions in the communication system of FIG. 1.

In a following step 604, the connectivity management device 140 transmits, to the residential gateway that initiated the probe-sending procedure having involved the received transmission quality reports, the transmission parameters that were adopted at the step 602 and that led to the transmission map determined at the step 603, so as to enforce said radio transmission parameters to each terminal device paired with said residential gateway. The algorithm in FIG. 6 is then ended.

FIG. 7 schematically illustrates an algorithm implemented by the connectivity measurement device 140 for performing a temporary pairing between at least one terminal device and a residential gateway in the communication system of FIG. 1.

In a step 701, the connectivity management device 140 detects a disconnection of a residential gateway from the communication system of FIG. 1. For example, in order to be able to relay messages between terminal devices and the server 130, each residential gateway in the communication system of FIG. 1 establishes a connection between the server 130 and, when this connection is broken, the server 130 informs the connectivity management device 140 thereof; in the same way, the server 130 informs the connectivity management device 140 when such a residential gateway has established a connection with the server 130. Other connection and disconnection detection methods may be used, such as for example a mechanism of regular transmission of a message (e.g. of the Ping type), from each residential gateway in the communication system of FIG. 1 to the connectivity management device 140.

In a following step 702, the connectivity management device 140 selects a temporary replacement parent residential gateway for each terminal device that was paired with the residential gateway the disconnection of which was detected at the step 701. Using of a temporary replacement parent residential gateway allows limiting the quantity of messages sent to the server 130 by ensuring that a residential gateway will attempt to acknowledge said messages before the expiry of the timer previously described in relation to FIG. 3, in particular when the residential gateways in the communication system of FIG. 1 use the same timer duration.

The connectivity management device 140 selects said temporary replacement parent residential gateway using the transmission map available before the disconnection detection. Indeed, the transmission map indicates which are the residential gateways that can be reached by the terminal devices that were paired with the residential gateway that was disconnected. The connectivity management device 140 selects said temporary replacement parent residential gateway from the residential gateways that can be reached by said terminal devices according to said transmission map.

The connectivity management device 140 selects said temporary replacement parent residential gateway using an additional criterion. For example, the connectivity management device 140 selects said temporary replacement parent residential gateway further using information, coming from the server 130, indicating for each concerned terminal device which residential gateway relays the most messages in place of the parent residential gateway that was disconnected. The connectivity management device 140 may thus select a temporary replacement parent residential gateway that is different from one terminal device in question to another.

In a following step 703, the connectivity management device 140 sends to the temporary replacement parent residential gateway selected at the step 702 a notification according to which said residential gateway adopts the role of temporary replacement parent residential gateway for the terminal devices that were previously paired with the disconnected parent gateway. The notification includes an identification of said terminal devices. Said terminal devices are then paired with said temporary replacement parent residential gateway until the residential gateway that was disconnected is reconnected in the communication system of FIG. 1, as described below in relation to FIG. 8. The algorithm in FIG. 7 is then ended.

FIG. 8 schematically illustrates an algorithm implemented by the connectivity management device 140 for cancelling a temporary pairing between at least one terminal device and a residential gateway in the communication system of FIG. 1.

In a step 801, the connectivity management device 140 detects a reconnection of a residential gateway in the communication system of FIG. 1. The connectivity management device 140 may be informed thereof by the server 130 or by reception of messages from said residential gateway.

In a following step 802, the connectivity management device 140 sends, to the temporary replacement parent residential gateway that was selected following detection of disconnection of said residential gateway, a notification according to which said temporary replacement parent residential gateway abandons the role of temporary replacement parent residential gateway for the terminal devices that were previously paired with the reconnected parent gateway. The notification includes an identification of said terminal devices. The temporary pairing with said temporary replacement parent residential gateway then ends. The algorithm in FIG. 8 is then ended.

It should be noted that not all the terminal devices in the communication system need to be paired. Indeed several types of terminal device may coexist in the communication system. There may be fixed terminal devices therein, such as sensors in a dwelling. Such terminal devices are typically paired with a residential gateway installed in the dwelling, the residential gateways in the vicinity of the dwelling being able to fulfil the function of relays on behalf of said residential gateway in the event of failure in the communication chain between said terminal devices and the server 130 via said residential gateway. There may also be mobile terminal devices therein, which will only temporarily be in communication range of individual residential gateways. Such terminal devices are typically not paired with a residential gateway in the communication system of FIG. 1. In this case, at least one residential gateway in communication range of the mobile terminal device at the time when said mobile terminal device sends a message to the server 130 will relay said message and send an acknowledgement once the timer previously described in relation to FIG. 3 has expired. It may then happen that several residential gateways relay the same message to the server 130, thus creating redundancy of information; the gathering service is then provided, to the detriment of optimisation with regard to radio access and with regard to connection with the server 130. This redundancy of information may however be beneficial vis-à-vis mobile terminal devices by enabling offering a service of estimation of geolocation of said mobile terminal devices by knowing the geographical position of the concerned residential gateways.

It should also be noted that the communication system of FIG. 1 may be installed in addition to a gathering infrastructure based on fixed permanent gateways disposed on geographically high points, in particular for covering blank areas neglected by said gathering infrastructure. In this case, a message sent by a mobile terminal device situated in a geographical area covered by said gathering infrastructure involves an acknowledgement from a gathering gateway of said infrastructure. The residential gateways in communication range of said mobile terminal device detect this acknowledgement before the expiry of the timer previously described in relation to FIG. 3 and do not relay the message. If said mobile terminal device is situated in a blank area, at least one residential gateway then relays the message to the gathering server. When a message is sent by a fixed terminal device paired with a residential gateway and said fixed terminal device is situated in a geographical area covered by said gathering infrastructure, said message will be doubly acknowledged and doubly relayed to the gathering server. The gathering server may then warn the connectivity management device 140 of such a redundancy and the connectively management device 140 may then cancel the pairing of said fixed terminal device with its parent residential gateway in the same way as the connectivity management device 140 cancels a temporary pairing, as previously described in relation to FIG. 8.

The invention claimed is:

1. A method for relaying a message wirelessly received by a residential gateway from a terminal device, said residential gateway forming part of a communication system comprising a plurality of residential gateways connected to a server for which said message is intended, wherein the method comprises:
   determining by said residential gateway whether said terminal device has previously been paired with said residential gateway;
   when said terminal device has previously been paired with said residential gateway, wirelessly transmitting by said residential gateway to said terminal device an acknowledgement of said received message and propagating by said residential gateway said received message to said server; and
   when said terminal device has not previously been paired with said residential gateway, activating by said residential gateway a timer of predetermined duration at the end of which, when no wirelessly-transmitted acknowledgement of said message has been detected, said residential gateway wirelessly transmits to said terminal device an acknowledgement of said received message and propagates said received message to said server.

2. The method according to claim 1, wherein said residential gateway randomly determines the duration of said timer between a lower bound and an upper bound, the lower bound defining a maximum theoretical lapse of time between the reception by a residential gateway of a message generated by a terminal device and the transmission of an acknowledgement of said message by the residential gateway with which said terminal device is paired, the upper bound defining a maximum theoretical lapse of time between the reception by a residential gateway of a message generated by a terminal device and the transmission of an acknowledgement of said message by a residential gateway with which said terminal device is not paired.

3. The method according to claim 1, wherein said residential gateway initiates a procedure of sending probes comprising:
   selecting a set of radio transmission parameters from a predefined collection of sets of radio transmission parameters;
   performing a sending of at least one probe using said selected set of transmission parameters; and
   reiterating the sending using another set of parameters, until the entire collection of sets of radio transmission parameters has been used, or until a connectivity management device interrupts said procedure of sending probes.

4. The method according to claim 3, wherein said residential gateway triggers the procedure of sending probes following an instruction coming from the connectivity management device, or wherein said residential gateway periodically triggers the procedure of sending probes, or wherein said residential gateway triggers the procedure of sending probes following a phase of connection of said residential gateway to the server.

5. The method according to claim 3, wherein, following the procedure of sending probes, said residential gateway receives radio transmission parameters to be enforced to each terminal device paired with said residential gateway for wirelessly transmitting messages intended for said server.

6. The method according to claim 3, wherein said radio transmission parameters are transmit-power and/or spreading-factor parameters.

7. The method according to claim 3, wherein, following reception of a probe, said residential gateway performs:
   determining quality of reception of said probe;
   determining radio transmission parameters that have been used to transmit said probe; and
   transmitting, to the connectivity management device, a transmission quality report including information representing the quality of reception of said probe and radio transmission parameters that have been used to transmit said probe.

8. The method according to claim 7, wherein, upon reception of transmission quality reports, the connectivity management device of the communication system performs:
   determining which set of radio transmission parameters used by a residential gateway in the context of a procedure of sending probes enables said residential gateway to communicate with a number of other residential gateways higher than and as close as possible to a predefined number of residential gateways; and
   transmitting to said residential gateway the determined set of radio transmission parameters so as to enforce said set of parameters to each terminal device paired with said residential gateway.

9. The method according to claim 8, wherein the connectivity management device determines a transmission map representative of connectivity of the communication system and wherein, upon detection of a disconnection of a residential gateway from the communication system, the connectivity management device performs:

selecting, according to the transmission map, a temporary replacement residential gateway for temporarily replacing, in terms of pairing, said disconnected residential gateway with at least one determined terminal device; and informing said temporary replacement residential gateway of the temporary pairing with each determined terminal device.

10. The method according to claim 8, wherein, upon detection of a reconnection to the communication system of the previously disconnected residential gateway, the connectivity management device cancels the temporary pairing and informs said temporary replacement residential gateway thereof.

11. A non-transitory information storage medium, storing a computer program comprising instructions for implementation, by a residential gateway, of a method for relaying a message wirelessly received by the residential gateway from a terminal device, when said program is executed by a processor of said residential gateway, wherein said residential gateway forms part of a communication system comprising a plurality of residential gateways connected to a server for which said message is intended, wherein the method comprises:

determining whether said terminal device has previously been paired with said residential gateway;

when said terminal device has previously been paired with said residential gateway, wirelessly transmitting to said terminal device an acknowledgement of said received message and propagating said received message to said server; and when said terminal device has not previously been paired with said residential gateway, activating a timer of predetermined duration at the end of which, when no wirelessly-transmitted acknowledgement of said message has been detected, said residential gateway wirelessly transmits to said terminal device an acknowledgement of said received message and propagates said received message to said server.

12. A residential gateway configured for acting as a relay of a wirelessly received message from a terminal device, said residential gateway being configured to form part of a communication system comprising a plurality of residential gateways connected to a server for which said message is intended, wherein said residential gateway comprises:

a radio interface; and processing circuitry configured to:

determine whether said terminal device has previously been paired with said residential gateway;

when said terminal device has previously been paired with said residential gateway, cause the radio interface to wirelessly transmit to said terminal device an acknowledgement of said received message and propagate said received message to said server; and when said terminal device has not previously been paired with said residential gateway, activate a timer of predetermined duration at the end of which, when no wirelessly-transmitted acknowledgement of said message has been detected, cause the radio interface to wirelessly transmit to said terminal device an acknowledgement of said received message and propagate said received message to said server.

13. The residential gateway according to claim 12, wherein the processing circuitry comprises memory and a processor configured to execute instructions from the memory.

14. The residential gateway according to claim 12, wherein the processing circuitry comprises a field-programmable gate array.

15. The residential gateway according to claim 12, wherein the processing circuitry comprises an application specific integrated circuit.

\* \* \* \* \*